(12) United States Patent
Aoki

(10) Patent No.: US 7,093,155 B2
(45) Date of Patent: Aug. 15, 2006

(54) INFORMATION PROCESSING SYSTEM AND METHOD FOR PATH FAILOVER

(75) Inventor: Makoto Aoki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 246 days.

(21) Appl. No.: 10/807,202

(22) Filed: Mar. 24, 2004

(65) Prior Publication Data
US 2005/0120259 A1    Jun. 2, 2005

(30) Foreign Application Priority Data
Nov. 18, 2003   (JP)   ............... 2003-387942

(51) Int. Cl.
*G06F 11/00* (2006.01)
(52) U.S. Cl. ............... 714/4; 714/2; 714/43; 370/225; 370/248
(58) Field of Classification Search .......... None
See application file for complete search history.

(56) References Cited

U.S. PATENT DOCUMENTS

| | | | |
|---|---|---|---|
| 5,404,487 A | | 4/1995 | Murata et al. |
| 5,944,838 A | * | 8/1999 | Jantz ............... 714/6 |
| 6,145,024 A | | 11/2000 | Maezawa et al. |
| 6,145,028 A | * | 11/2000 | Shank et al. ............... 710/31 |
| 6,341,356 B1 | * | 1/2002 | Johnson et al. ............... 714/4 |
| 6,526,521 B1 | * | 2/2003 | Lim ............... 714/4 |
| 6,542,944 B1 | * | 4/2003 | D'Errico ............... 710/38 |
| 6,606,630 B1 | | 8/2003 | Gunlock | 
| 2004/0037277 A1 | | 2/2004 | Matthews et al. |
| 2004/0078632 A1 | * | 4/2004 | Infante et al. ............... 714/5 |
| 2004/0117441 A1 | * | 6/2004 | Liu et al. ............... 709/203 |
| 2005/0097243 A1 | | 5/2005 | Yamashita et al. |

FOREIGN PATENT DOCUMENTS

| | | |
|---|---|---|
| JP | 11-296311 | 10/1999 |
| JP | 2002-49575 | 2/2002 |

OTHER PUBLICATIONS

EMC Corporation, PowerPath Version 3.0 Product Guide, Jun. 2002, EMC Corporation, pp. 2-2 and 2-6.*

* cited by examiner

*Primary Examiner*—Scott Baderman
*Assistant Examiner*—Paul Contino
(74) *Attorney, Agent, or Firm*—Mattingly, Stanger, Malur & Brundidge, P.C.

(57) ABSTRACT

An information processing system comprises a storage and a plurality of information processing apparatuses requesting data input/output from the storage. The information processing apparatus comprises an error detection section, a changeover evaluation section, and a changeover section. The error detection section detects an error occurred on a path according to a result of a data input/output request. The changeover evaluation section detects occurrence of error on a specified number of paths to determine whether or not to change an information processing apparatus connected to the storage even before occurrence of errors on all paths. The changeover section uses a determination result from the changeover evaluation section to change the information processing apparatus which requests data input/output from the logical unit.

16 Claims, 15 Drawing Sheets

FIG.4

| Case | Path1 | Path2 | Path3 | Path4 | Path5 | Path6 | Path7 | Path8 |
|---|---|---|---|---|---|---|---|---|
| 1 | Instantaneous break | Instantaneous break | Instantaneous break | Instantaneous break | Normal | Normal | Normal | Normal |
| 2 | Accumulation | Accumulation | Accumulation | Accumulation | Accumulation | Accumulation | Normal | Normal |
| 3 | Performance | Performance | Performance | Performance | Performance | Performance | Performance | Normal |

FIG.7

Path error management table

| Path | Error type | Start time | Monitoring period | Criterion | Detected value |
|---|---|---|---|---|---|
| 1 | Instantaneous break error | 2003/9/1 10:20:30.020 | 30 | 20 | 19 |
|  | Accumulation error | 2003/9/1 10:20:30.020 | 30 | 50 | 30 |
|  | Performance error | 2003/9/1 10:20:30.020 | - | 1 | 0 |
| 2 | Instantaneous break error | 2003/9/1 10:20:30.020 | 30 | 20 | 0 |
|  | Accumulation error | 2003/9/1 10:20:30.020 | 30 | 50 | 0 |
|  | Performance error | 2003/9/1 10:20:30.020 | - | 1 | 0 |
| 3 | ⋮ |  |  |  |  |

FIG.9

Operation statistics management table

| Path | 2003/8/1 | | 2003/9/1 | | 2003/10/1 | | 2003/11/1 | |
|---|---|---|---|---|---|---|---|---|
| | Bytes | Time | Bytes | Time | Bytes | Time | Bytes | Time |
| 1 | 100 | 1000 | 90 | 1000 | 80 | 1000 | 50 | 1000 |
| 2 | 100 | 1000 | 90 | 1000 | 80 | 1000 | 50 | 1000 |
| 3 | 100 | 1000 | 90 | 1000 | 80 | 1000 | 50 | 1000 |
| 4 | 100 | 1000 | 90 | 1000 | 80 | 1000 | 50 | 1000 |
| 5 | 100 | 1000 | 90 | 1000 | 80 | 1000 | 50 | 1000 |
| 6 | 100 | 1000 | 90 | 1000 | 80 | 1000 | 50 | 1000 |
| 7 | 100 | 1000 | 90 | 1000 | 90 | 1000 | 90 | 1000 |
| 8 | 100 | 1000 | 90 | 1000 | 90 | 1000 | 90 | 1000 |

FIG.11

Sever changeover threshold value table

| Error type | Ratio to total paths | |
|---|---|---|
| | Daytime | Nighttime |
| Instantaneous break error | 50% | 40% |
| Accumulation error | 80% | 70% |
| Performance error | 90% | 80% |

FIG.12

| Case | Path1 | Path2 | Path3 | Path4 | Path5 | Path6 | Path7 | Path8 |
|---|---|---|---|---|---|---|---|---|
| 4 | Instantaneous break | Instantaneous break | Instantaneous break | Accumulation | Accumulation | Normal | Normal | Normal |
| 5 | Accumulation | Accumulation | Accumulation | Performance | Performance | Performance | Performance | Normal |
| 6 | Instantaneous break | Instantaneous break | Accumulation | Accumulation | Performance | Performance | Normal | Normal |

FIG.14

Error score table

| Error type | Score | |
|---|---|---|
| | Daytime (1) | Nighttime (1.1) |
| Instantaneous break error | 2 | 2.2 |
| Accumulation error | 1.43 | 1.57 |
| Performance error | 1.25 | 1.38 |

INFORMATION PROCESSING SYSTEM AND METHOD FOR PATH FAILOVER

BACKGROUND OF THE INVENTION

The present invention relates to an information processing system, an information processing apparatus, a control method of the information processing apparatus, and a program. More specifically, the present invention relates to detection of errors in a storage.

In recent years, there is an increase in the amount of data processed in information processing systems. A large-capacity storage needs to ensure input/output performance and reliability comparable to its storage capacity. Some systems have been developed to multiplex a logical path (input/output channel) to the storage and appropriately assign the logical path a data input/output request (I/O request) to the storage.

When an error occurs on the logical path, the I/O path needs to be changed. For this purpose, there is proposed a technology to shorten the time needed to change the I/O path by rewriting a logical disk management table for all nodes (e.g., see JP-A No. 49575/2002).

According to another proposed technology (e.g., see JP-A No. 296311/1999), a counter is provided to store the number of error detections for each part that constitutes the system and can be detached therefrom. Further, there is provided a logic to totally determine the counter values. In this manner, it is made possible to accurately locate faulty portions, exclude them from the system, and continuously operate the system using normal portions.

The above-mentioned prior art changes the server after detecting that all the paths are subject to errors and no I/O process is available after several retries. There has been no consideration about degradation of the throughput during the error detection.

SUMMARY OF THE INVENTION

It is therefore an object of the present invention to prevent degradation of the throughput during the error detection by changing the server before errors are detected on all the paths.

The present invention provides an information processing system having a storage and a plurality of information processing apparatuses. The storage has a logical unit logically assigned to a physical device. The plurality of information processing apparatuses is selectively connected to the storage and request data input/output from the storage. The information processing system requests data input/output via a plurality of paths as communication channels to the logical unit. The information processing apparatus comprises an error detection section, a changeover evaluation section, and a changeover section. The error detection section detects an error occurred on a path according to a result of a data input/output request. The changeover evaluation section detects occurrence of error on a specified number of paths to determine whether or not to change an information processing apparatus connected to the storage even before occurrence of errors on all paths. The changeover section uses a determination result from the changeover evaluation section to change the information processing apparatus requesting data input/output from the logical unit.

The present invention makes it possible to improve the throughput during a path error detection period when the server is changed.

BRIEF DESCRIPTION OF THE DRAWINGS

FIG. 4 is an explanatory diagram of a table used to determine cluster changeover according to the first embodiment of the present invention;

FIG. 7 is an explanatory diagram of an error management table according to the first embodiment of the present invention;

FIG. 9 is an explanatory diagram of an operation statistics management table according to the first embodiment of the present invention;

FIG. 11 is an explanatory diagram of a server changeover threshold table according to the first embodiment of the present invention;

FIG. 12 is an explanatory diagram of an example table used for path error determination according to a second embodiment of the present invention;

FIG. 14 is an explanatory diagram of an error score table according to the second embodiment of the present invention.

DETAILED DESCRIPTION OF THE PREFERRED EMBODIMENTS

Embodiments of the present invention will be described in further detail with reference to the accompanying drawings.

Figure 1:
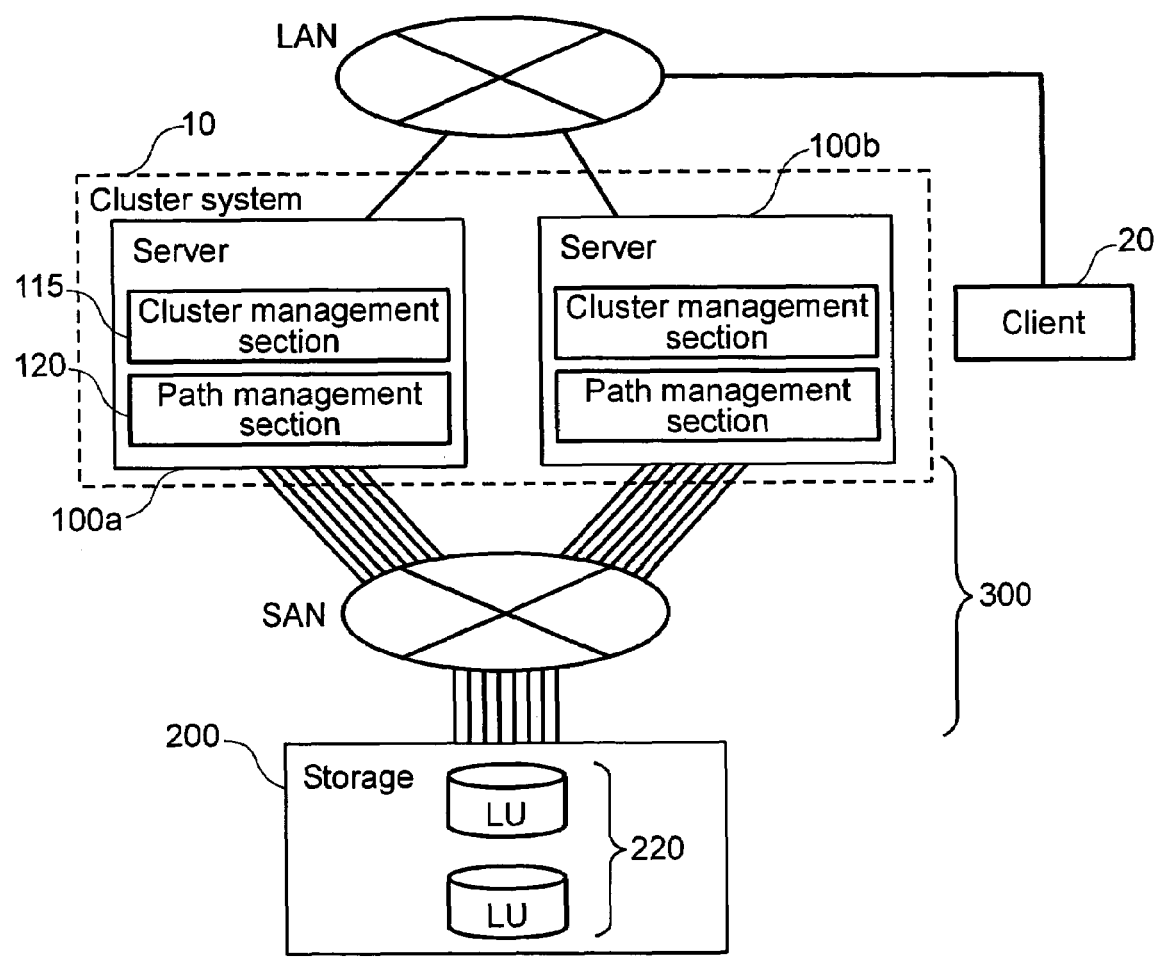
FIG. 1 is a block diagram showing an overall configuration of an information processing system according to a first embodiment of the present invention.

FIG. 1 is a block diagram showing an overall configuration of an information processing system according to a first embodiment of the present invention.

The information processing system includes a cluster system 10 and at least one storage 200. The cluster system 10 comprises a plurality of clustered servers (information processing apparatuses) 100*a* and 100*b*. While the embodiment describes the information processing system having one cluster system 10 and one storage 200, the information processing system may comprise a plurality of cluster systems 10 and a plurality of storages 200.

A server 100 has a CPU (Central Processing Unit), memory, and the like. According to commands from a client terminal 20, the server executes various application programs by accessing data stored in the storage 200. Further, the server 100 is provided with a cluster management section (cluster software) 115 that manages operations of the server in the cluster system 10 and performs a failover process to change the server. Furthermore, the server 100 is provided with a path management section 120 that logically manages a plurality of paths and determines a path to issue an I/O request from an application program 110.

The storage 200 is connected to the server 100 via a network such as SAN (Storage Area Network). Generally, the fiber channel protocol is used for communication between the server 100 and the storage 200 via SAN. That is to say, the server 100 transmits a data access request in units of blocks to the storage 200 according to the fiber channel protocol. It is not always necessary to use the SAN for connecting the server 100 and the storage 200. They may be connected via the other networks such as LAN or may be directly connected via SCSI (Small Computer System Interface).

A physical path 300 is assigned to the SAN that connects between the server 100 and the storage 200. The physical path 300 is a physical communication channel comprising hardware that connects between the server 100 and the storage 200. The server 100 accesses data stored in the storage 200 via a plurality of physical paths 300. The path management section 120 enhances a bandwidth by multiplexing the physical path 300 that transmits an I/O request to the storage 200. In this manner, the path management section 120 solves a bottleneck in data access and improves the data input/output performance. The path management section 120 manages the physical path 300 using a logical path corresponding to the physical path 300.

The server 100 is connected to the storage client terminal 20 via a network such as LAN (Local Area Network).

The storage 200 has a plurality of logical units (LUs) 220 and processes data I/O in response to I/O requests from the server 100. The logical unit 220 is a storage area that logically defines a storage resource (physical device) provided for the storage 200. While the storage 200 in FIG. 1 comprises two logical units, it may be preferable to use three or more logical units. Available storage resources include not only hard disks (disk arrays), but also various storage media such as flexible disks, semiconductor storages, and the like.

While the embodiment describes a case where the server 100 is a computer such as a personal computer, a workstation, a mainframe computer, and the like, the server 100 may be a network apparatus such as a router, a hub, and the like.

Figure 2:
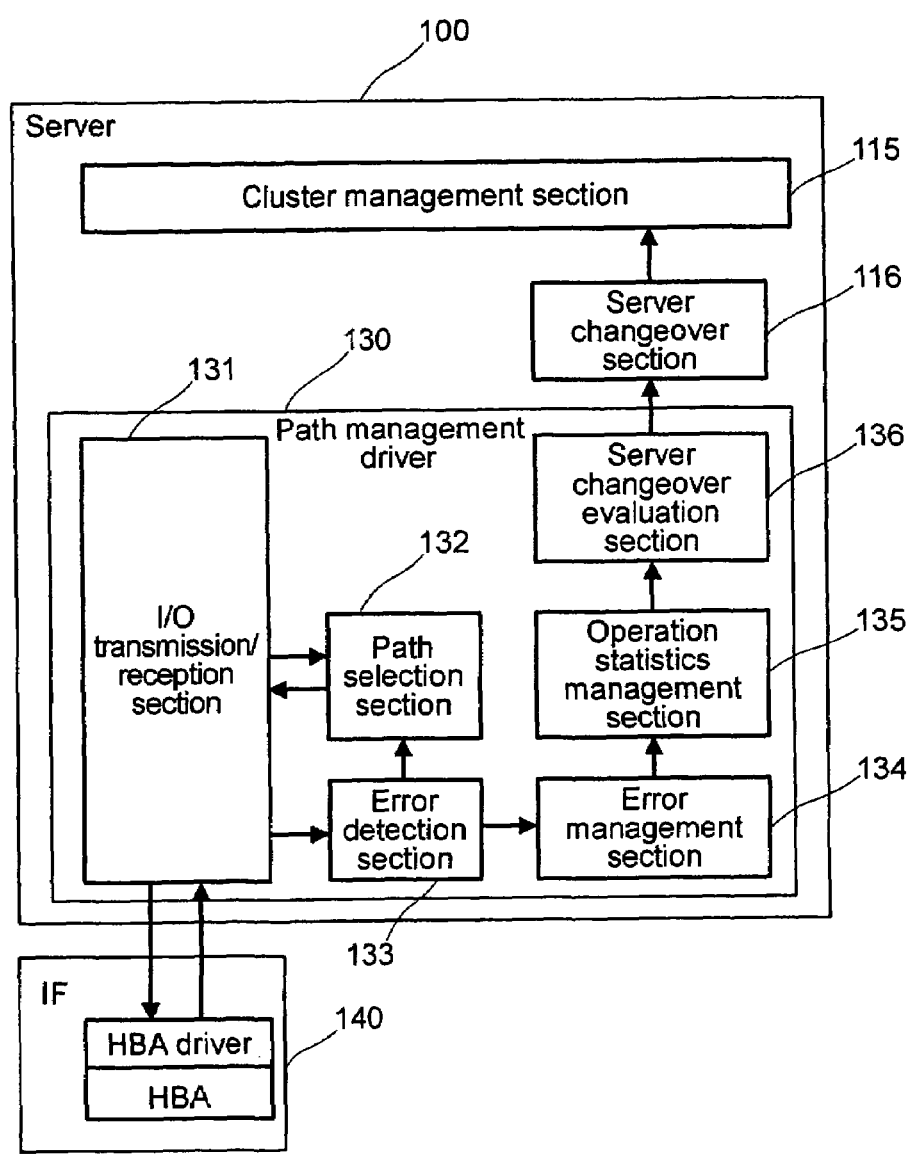
FIG. 2 is a function block diagram showing details of a server 100 according to the first embodiment of the present invention.

FIG. 2 is a function block diagram showing details of a server 100

The server 100 has a cluster management section 115, a server changeover section 116, and a path management driver 130. The server 100 is attached with an interface (IF) 140 comprising a host bus adapter (HBA) and an HBA driver.

The path management driver 130 has an I/O transmission/reception section 131, a path selection section 132, an error detection section 133, an error management section 134, an operation statistics management section 135, and a server changeover evaluation section 136.

When the path management section 120 receives an I/O request, the I/O transmission/reception section 131 transmits this I/O request to a path (interface 140) selected by the path selection section 132. The I/O transmission/reception section 131 then notifies the application program 110 of I/O termination received by the interface 140.

The path selection section 132 logically manages the physical path 300 between the server 100 and the storage 200. The path selection section 132 determines the IF 140 to which the I/O request issued by the application program 110 is allocated. The path selection section 132 then selects the path 300 to be used for the I/O request. The path selection section 132 also distributes loads by appropriately allotting I/O requests to the physical paths 300. When any of the physical paths 300 causes an error, the path selection section 132 provides a function to disconnect that physical path 300 and continue data access to the storage 200 through the normal physical path 300. This function prevents services from being stopped due to physical path errors and increases the system reliability.

The error detection section 133 monitors whether or not the I/O process terminates normally in terms of an I/O termination notification issued from the storage 200 in response to the I/O request. The error detection section 133 has an I/O management table that stores a path ID for the abnormally terminated I/O process, a path state (online or offline), a cause of the error, and the time when the abnormally termination was notified. When detecting abnormal termination of the I/O process, the error detection section 133 stores information about the failed path in the I/O management table to update it.

The error detection section 133 receives the I/O request provided from the application program 110 and the I/O termination notification from the storage 200. The error detection section 133 thus obtains the amount of data for the normally terminated I/O request and the processing time needed for the I/O request from the I/O request and the I/O termination notification.

The error management section 134 has a path error management table (FIG. 7). The error management section 134 reads the I/O management table to obtain error information about paths. The error management section 134 stores the obtained path error information in the path error management table to update the number of error detections (detection value) counted for each path and each error type.

The operation statistics management section 135 has an operation statistics management table (FIG. 9). The operation statistics management section 135 obtains the amount of data for the normally terminated I/O request and the processing time needed for the I/O request. The operation statistics management section 135 obtains these pieces of information from the I/O request and the I/O termination notification both of which the error detection section 133 has obtained. The operation statistics management section 135 then updates the corresponding path, the amount of data (bytes) during the associated time period, and the time data in the operation statistics management table.

Based on a result of detecting an error occurred on the path, the server changeove revaluation section 136 determines whether or not to perform a failover that changes the server in the cluster. The server changeover evaluation section 136 sends the result to a server changeover section 116. In order to perform the failover, the server changeover evaluation section 136 analyzes the error occurred on the path according to the following three types of errors, i.e., instantaneous break error, accumulation error, and performance error.

A disconnection error is assumed to be the instantaneous break error when an error occurs on the same path during one I/O operation and the subsequent I/O operation terminates normally. The instantaneous break error occurs when the transmission channel becomes unstable due to a worn-out optical fiber, an unstable power supply, and the like.

The accumulation error is determined when too many errors occur to exceed the specified limit within a specified period (e.g., within a month). There may be alternatives to determining the accumulation error instead of based on the number of errors within a specified period. For example, the accumulation error may be determined when the number of errors reaches a specified count without defining a period to count errors. Further, the accumulation error may be determined when a specified number of successive I/O requests cause too many errors to exceed a specified threshold. Moreover, the accumulation error may be determined when a ratio of error I/O requests to all I/O requests reaches a specified value.

The performance error is determined when the performance degrades for a specified value compared to the state in which the path was installed initially. As will be described later, the operation statistics management section 135 determines the performance error as follows. The operation statistics management section 135 obtains the data amount and the process time of the I/O process and determines the performance error when the response degrades 60% compared to the initial state.

The IF 140 works as an interface between the server 100 and the storage 200 and includes the host bus adapter (HBA) and the HBA driver. For example, the HBA represents an SCSI (Small Computer System Interface) adapter, a fiber channel adapter, and the like. The IF 140 is uniquely provided for the path 300. The IF 140 processes an I/O request assigned by the path selection section 132 and accesses the storage 200. That is to say, the server 100 can interchange data input/output requests (I/O requests) with the storage 200 by means of the IF 140.

Figure 3:
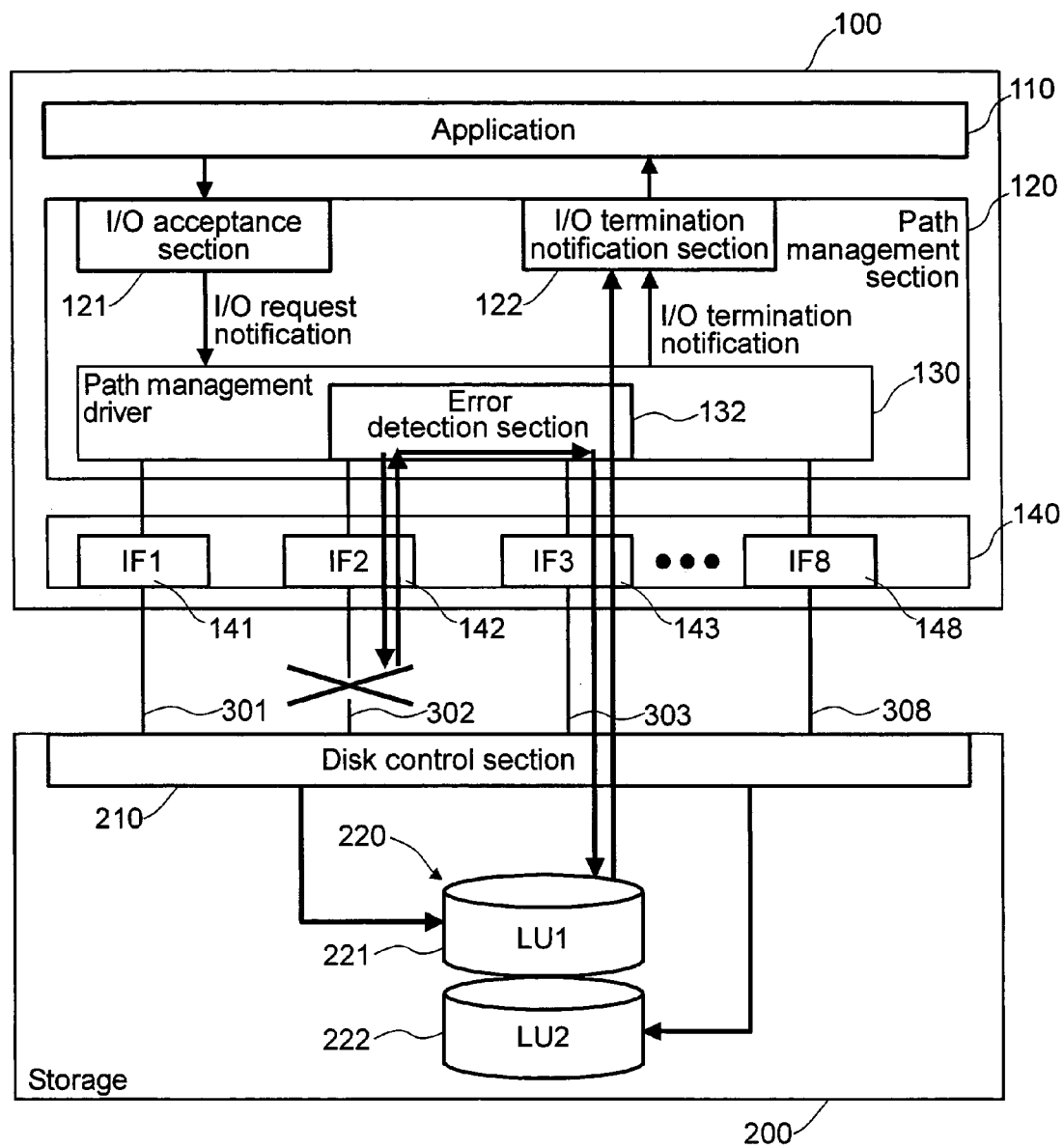
FIG. 3 is a block diagram showing operations of an error detection section 133 according to the first embodiment of the present invention.

FIG. 3 is a block diagram showing operations of the error detection section according to the first embodiment of the present invention.

The application program 110 issues an input/output request to the path management section 120 in order to access data stored in the storage 200. The path management section 120 uses an I/O acceptance section 121 to accept the I/O request issued by the application program 110. The accepted I/O request is sent to path management driver 130 for selection from the physical paths 301 through 308. The I/O request is transmitted to the selected path.

If the physical path is online (active), the storage processes the I/O request issued from the application program 110. The storage 200 returns an I/O termination notification indicating normal termination of the I/O process. An I/O termination notification section 122 notifies this I/O process notification to the application program 110.

If the physical path is off line (failed), the storage 200 does not process the I/O request issued from the application program 110. The I/O request times out on a channel up to the storage 200 and returns an I/O termination notification indicating abnormal termination of the I/O process to the path management driver 130. When detecting the abnormal termination of the I/O process, the path management driver 130 selects another path to transmit the I/O request to the storage 200. After processing the I/O request, the storage 200 returns an I/O termination notification indicating normal termination of the I/O process.

As shown in FIG. 3, for example, an I/O request is transmitted to a path 302 that is faulty. The error detection section 133 detects this state. The path selection section 132 selects another path 303 to transmit the I/O request to the storage 200. The storage 200 returns an I/O termination notification that is then transmitted to the application program 110.

The above-mentioned path error occurs due to temporary disconnection of a transmission channel constituting the path. For example, a worn-out optical fiber causes instantaneous break. Accordingly, contemporaneously installed optical fibers will wear out at similar times, causing temporary disconnection (instantaneous break). As a result, the I/O process is subject to a temporary error. If no action is taken, complete disconnection results to cause an I/O error.

Based on the determination of the server changeover evaluation section 136, the server changeover section 116 issues a server changeover command to the cluster management section 115 in order to perform a cluster failover for changing the server.

FIG. 4 is an explanatory diagram of a table used to determine cluster changeover according to the first embodiment of the present invention. The table shows cases of using eight paths and criteria for the server changeover section 116 to change the server based on the above-mentioned three types of error determination results.

Case 1 at the top of the table shows that the server needs to be changed when an instantaneous break error occurs on a half or more of all paths, i.e., when normal paths become less than half of all paths. For the ease of understanding, FIG. 4 shows that the instantaneous break error occurs on paths 1 through 4. The failover is also assumed to be performed even when the error occurs on the other four discontinuous paths in any combination.

Case 2 at the middle of the table shows that the server needs to be changed when an accumulation error occurs on 70% or more of all paths, i.e., when normal paths become less than 30% of all paths. For the ease of understanding, FIG. 4 shows that the accumulation error occurs on paths 1 through 6. The failover is also assumed to be performed even when the error occurs on the other six discontinuous paths in any combination.

Case 3 at the bottom of the table shows that the server needs to be changed when a performance error occurs on 80% or more of all paths, i.e., when normal paths become less than 20% of all paths. For the ease of understanding, FIG. 4 shows that the performance error occurs on paths 1 through 7. The failover is also assumed to be performed even when the error occurs on the other seven discontinuous paths in any combination.

When it is determined that a plurality of errors occurs on one path, there is a large influence on degrading the throughput. Serious errors are assumed to occur on the path with a high possibility to stop the information processing system. In FIG. 4, the instantaneous break error is mainly caused by the optical fiber wear. It is highly possible that contemporaneously installed optical fibers will wear out and fail at similar times. Accordingly, the failover is performed when errors occur on half of the paths. The server needs to be changed as early as possible to prevent the throughput from degrading. On the other hand, if a performance error occurs, the I/O process merely takes a longer time and is not executable. No failover is needed until performance errors occur on many paths. The system can operate using the current server and path.

Figure 5:
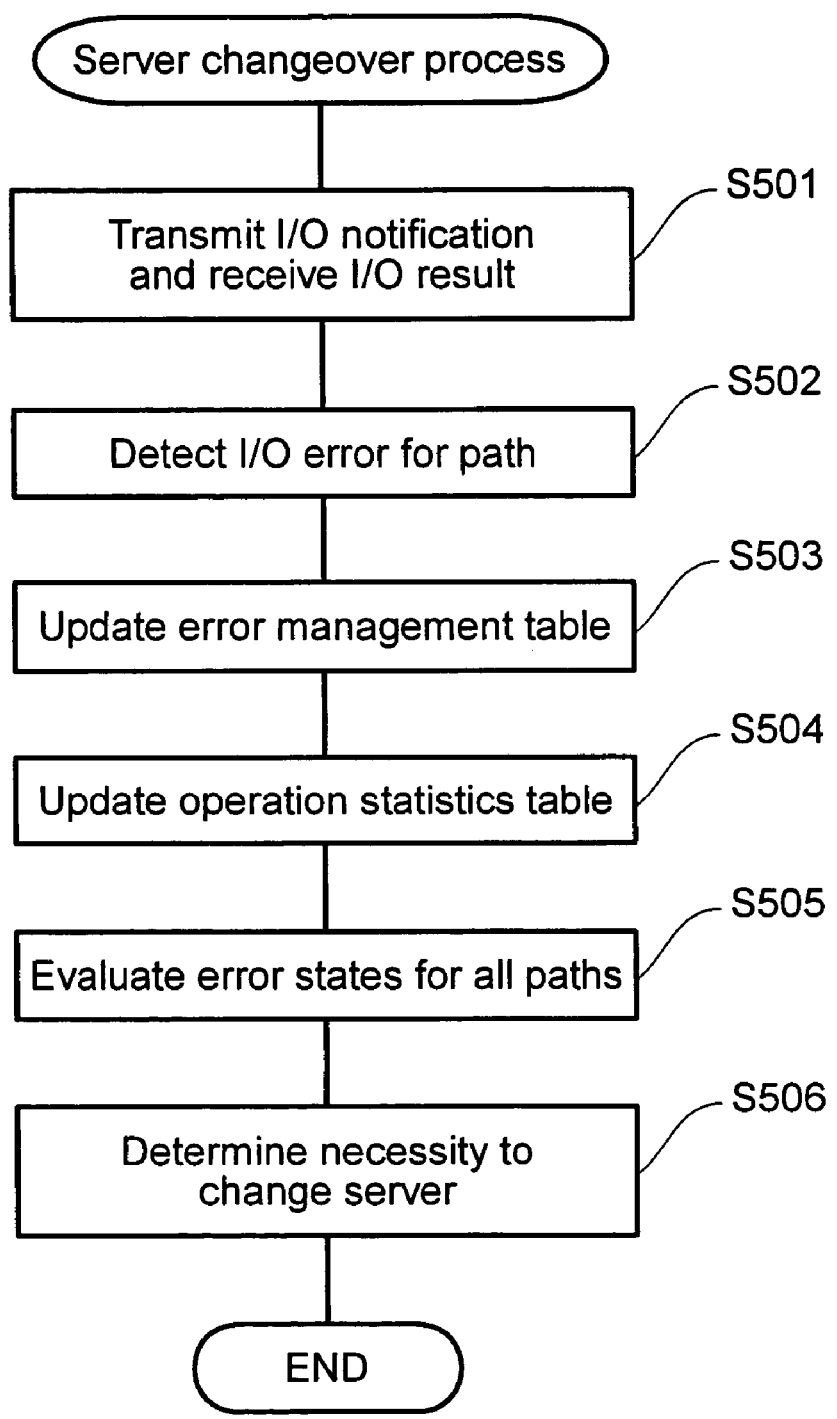
FIG. 5 is a flowchart of a server changeover process according to the first embodiment of the present invention.

FIG. 5 is a flowchart of a server changeover process according to the first embodiment of the present invention.

The application program 110 issues an I/O request, and the I/O acceptance section 121 receives it. The I/O transmission/reception section 131 transmits this I/O request to any of paths 301 through 308 selected by the path selection section 132. When completing an I/O process, the storage 200 issues an I/O termination notification indicating that the I/O process has terminated normally. The I/O termination notification is returned to the I/O transmission/reception section 131, the I/O termination notification section 122, and then to the application program 110 (S501). When the I/O process does not terminate normally, the storage 200 issues an I/O termination notification indicating that the I/O process has terminated abnormally.

Upon completion of the I/O process, the server changeover process detects an I/O failure (error) concerning the I/O process (S502). The server changeover process records information about the detected error in the error management table to update this table (S503), and then advances to step S505. If no I/O error is determined, the server changeover process records the result of the I/O process on the path to update the performance information in this table (S504), and then advances to step S505.

At step S505, the server changeover process uses the above-mentioned method in FIG. 4 (or a method to be described in FIG. 12) to evaluate error states of all paths. The process then determines the necessity of changing the server based on a result of comparison with a specified threshold (S506).

Figure 6:
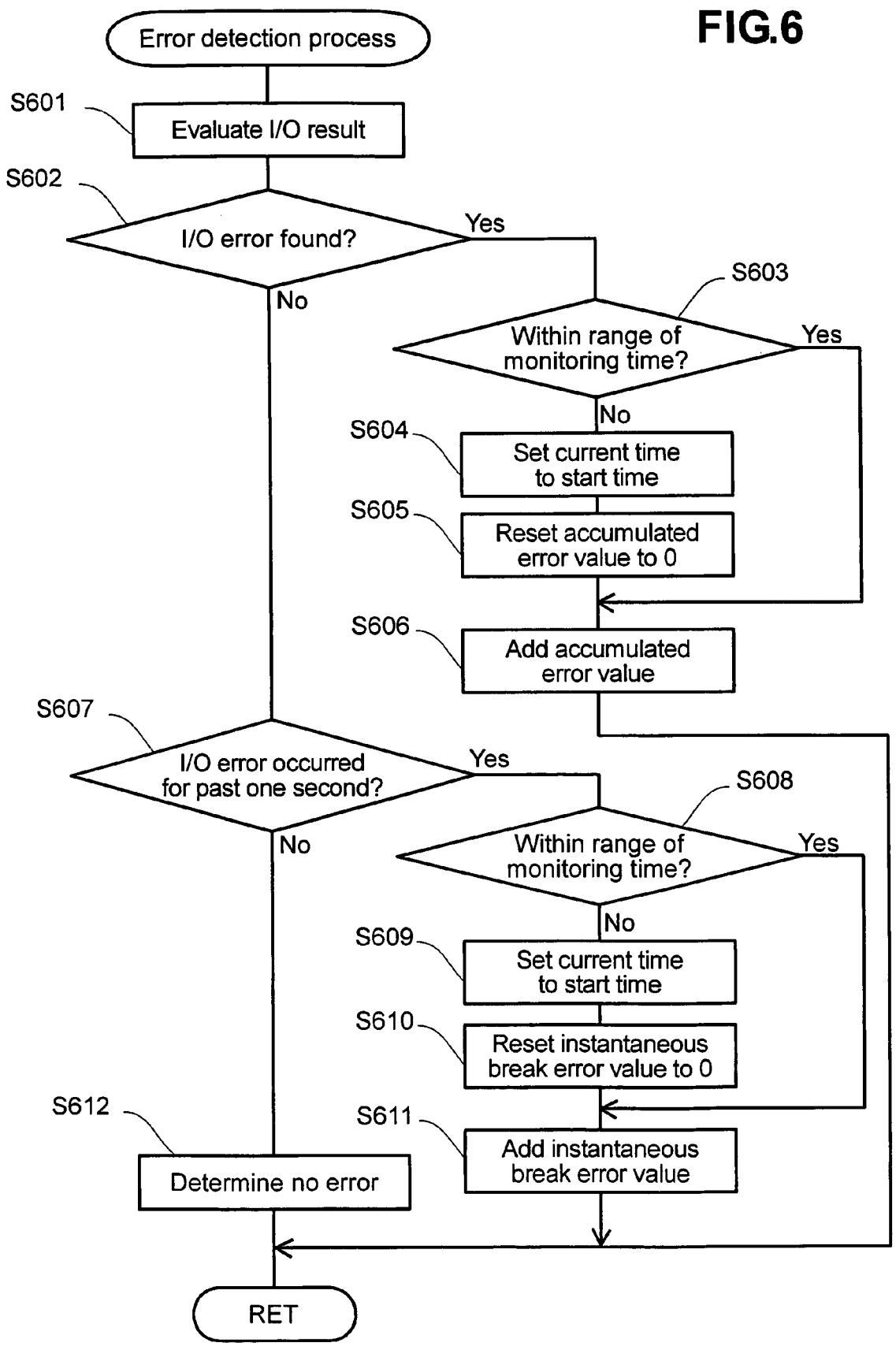
FIG. 6 is a flowchart of an error management table update process according to the first embodiment of the present invention.

FIG. 6 is a flowchart of an error management table update process according to the first embodiment of the present invention. This process is performed at step S503 of the server changeover process (FIG. 5).

Based on an I/O termination notification issued from the storage 200 and the like, the error detection section 133 first evaluates whether the I/O process has been performed normally or an error occurred during the I/O process.

It is determined whether or not an I/O error occurs (S602). When the determination result indicates no I/O error, control proceeds to step S607 without performing the process (S603 to S606) concerning the accumulation error. When the determination result indicates an I/O error, control proceeds to step S603 to perform the process (S603 to S606) concerning the accumulation error.

The accumulation error process first references a start time column and a monitoring time column corresponding to the accumulation error for the path in the error management table. The process determines whether or not the I/O error occurred within the specified monitoring time depending on whether or not the current time belongs to the specified range of monitoring time (S603). When the determination result indicates that the I/O error occurred within the specified monitoring time, control proceeds to step S606. The process increments the number of detected accumulation errors by one, and then terminates.

When the determination result at step S603 indicates that the I/O error occurred outside the specified monitoring time, the current time is set to the monitoring start time (S604). The process resets the detected accumulation error value to "0" (S605) to start a new monitoring time. The process increments the number of detected accumulation errors by one (S606), and then terminates.

When the determination result indicates no I/O error, control proceeds step S607. The process determines whether or not there is an I/O error in the I/O process executed during a specified instantaneous break monitoring time, e.g., one second in the example of FIG. 6 (S607). When the determination result indicates that no I/O error occurred for past one second, the process determines that no error occurs (S612), and then terminates without performing the process (S608 to S611) concerning the instantaneous break error.

When it is determined that an I/O error occurred for past one second, control proceeds to step S603 to perform the process (S608 to S611) concerning the instantaneous break error.

The instantaneous break error process first references a start time column and a monitoring time column corresponding to the instantaneous break error for the path in the error management table. The process determines whether or not the I/O error occurred within the specified monitoring time depending on whether or not the current time belongs to the specified range of monitoring time (S608). When the determination result indicates that the I/O error occurred within the specified monitoring time, control proceeds to step S611. The process increments the number of detected instantaneous break errors by one, and then terminates.

When the determination result at step S608 indicates that the I/O error occurred outside the specified monitoring time, the current time is set to the monitoring start time (S609). The process resets the detected instantaneous break error value to "0" (S610) to start a new monitoring time. The process increments the number of detected instantaneous break errors by one (S611), and then terminates.

FIG. 7 is an explanatory diagram of the path error management table according to the first embodiment of the present invention.

The path error management table stores a monitoring start time, a monitoring period, a criterion, and a detected value corresponding to the error type for each path and error type.

For example, the instantaneous break error is monitored for a monitoring time of 30 days from 10:20:30.020 on Sep. 1, 2003. When an instantaneous break error is detected during this monitoring time, the detected value is incremented by one to update the error management table. When an instantaneous break error is repeatedly detected to reach the criterion (20), the path is determined to be subject to the instantaneous break error. An instantaneous break error is determined to occur when it is detected more than once during the monitoring time. This aims at preventing a path's instability from being incorrectly identified to be an instantaneous break error. Such instability may result from a temporary cause such as power supply's instability.

A performance error is determined by averaging a plurality of I/O processes. If the performance degradation is observed just once, a performance error is assumed to occur. Accordingly, no monitoring period is defined.

Figure 8:
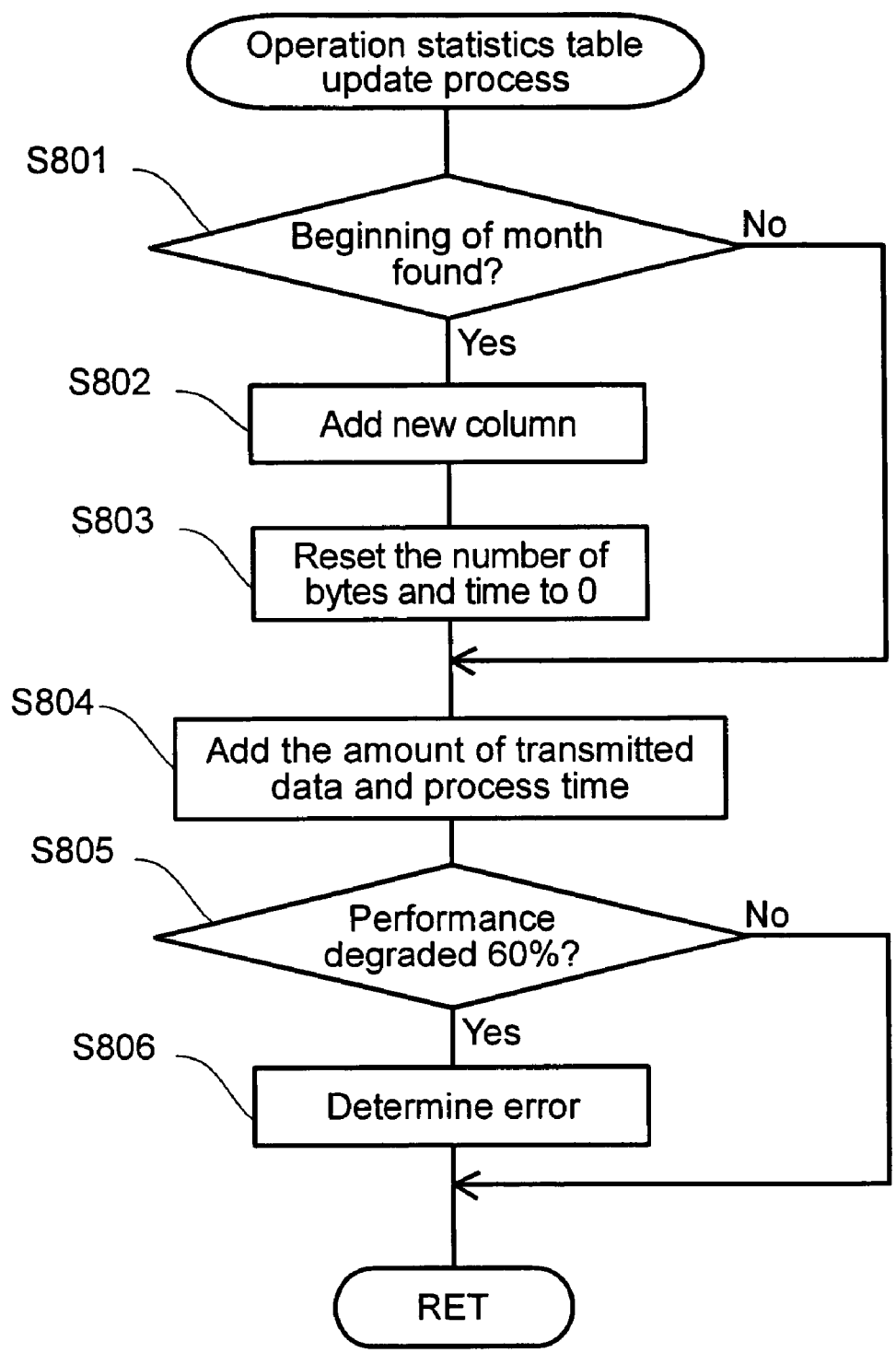
FIG. 8 is a flowchart of an operation statistics table update process according to the first embodiment of the present invention.

FIG. 8 is a flowchart of an operation statistics table update process according to the first embodiment of the present invention. This process is performed at step S504 of the server changeover process (FIG. 5).

The process first obtains the date and time from a timer provided in the server to determine whether or not the obtained date and time indicates a specified date and time of the month (S801). According to the example in FIG. 6, the specified date and time is configured to be the beginning of the month, i.e., the first day of the month, at 00:00. If the beginning of the month is not detected, control proceeds to step S804. If the beginning of the month is detected, the process adds a new column to the operation statistics table so as to record data for the new month (S802). The process initializes the following values to "0s": the amount of data transmitted to the path during an I/O process and the time spent for the I/O process (S803). In this manner, the process makes preparations for performance monitoring in the new period.

The process adds the following values to the corresponding columns in the operation statistics table (S804), i.e., the amount of data transmitted to the path used for the normally terminated I/O process and the time spent for the I/O process.

It is determined whether or not the performance degrades for a specified ratio, e.g., 60% in FIG. 6 (S805). This determination is performed periodically (e.g., once in a month) or according to a user's instruction. If the determination result indicates that the performance degradation reaches 60%, the process determines a performance error (S806), and then terminates. If the performance degradation does not reach 60%, the process terminates without determining a performance error.

The example in FIG. 8 monthly totals the path performance, i.e., responses of I/O processes on each path. In addition, it may be preferable to monitor the performance by specifying any period.

FIG. 9 is an explanatory diagram of the operation statistics management table according to the first embodiment of the present invention.

The operation statistics management table records accumulated values for the following correspondingly to each path and month: the amount of data transmitted to the path by an I/O process and the time spent for the I/O process on the path. It is possible to find a response for the I/O process during the monitoring period by dividing the accumulated process time into the amount of accumulated data.

It is sufficient to use the operation statistics table to record a response for the period (normally installation time) in which the performance was best, the accumulated amount of data for the I/O process during the current monitoring period, and the accumulated time spent for the I/O process.

The operation statistics management table in FIG. 9 monthly records the amount of data and the time spent for I/O processes. The other monitoring periods may be used to monitor the path performance.

Figure 10:
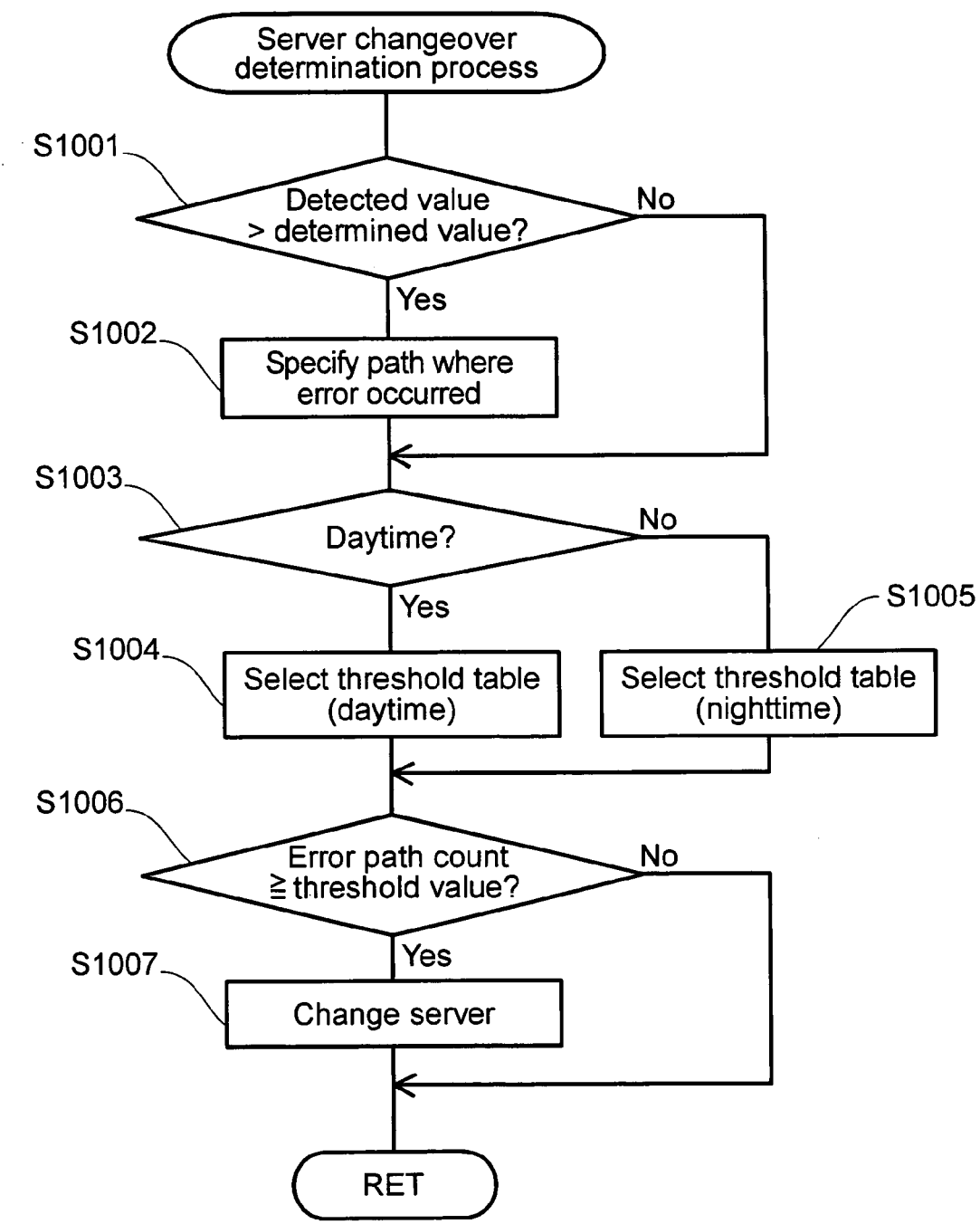
FIG. 10 is a flowchart of a server changeover determination process according to the first embodiment of the present invention.

FIG. 10 is a flowchart of a server changeover determination process according to the first embodiment of the present invention. This process is performed at step S506 of the server changeover process (FIG. 5).

The process first references the error management table (FIG. 7) to determine whether or not the detected value exceeds the criterion for each path (S1001). If the detected value exceeds the criterion, the process specifies a path where an error occurs (S1002). The process performs this comparison with the criterion for all paths.

The process determines whether or not the time slot is daytime, i.e., subject to a high I/O process load (S1003). The information processing system according to the embodiment is intended for a high-load time slot, i.e., a time slot with high I/O process load and a low-load time slot, i.e., a time slot with low I/O process load. For example, banking online systems and airline reservation systems cause high loads in the daytime. The high-load time slot and the low-load time slot are predetermined based on results of investigating I/O process loads.

If the daytime (high-load time slot) is detected, the process selects the daytime column (S1004) in the server changeover threshold table (FIG. 11). If the nighttime (low-load time slot) is detected, the process selects the nighttime column (S1005) in the server changeover threshold table. In this manner, the threshold is determined for each time slot. The server changeover threshold table in FIG. 11 defines the criterion for each error type, i.e., the ratio of the number of paths to the number of all paths.

The process compares the number of error-prone paths specified at step S1002 with the threshold selected at step S1004 or S1005 (S1006). If the number of paths exceeds the threshold, the process issues a server changeover command (S1007).

For example, a total of eight paths are used for the server changeover threshold table in FIG. 11. The threshold for an instantaneous break error is four paths (8×0.5=4) in the daytime or three paths (8×0.4=3.2) at night. A server changeover (failover) occurs at night even if instantaneous break errors are detected on a fewer paths than those in the daytime. Therefore, it is possible to suppress the failover in the daytime subject to high I/O loads and preferentially perform the failover at night subject to low I/O loads.

There may be an alternative to using the time-based criteria. It may be preferable to define criteria based on the I/O process amount and the throughput collected by the operation statistics management section 135. That is to say, a moderate criterion is used for the time slot with low I/O process load to promote the failover. A stringent criterion is used for the time slot with high I/O process load to suppress the failover.

FIG. 12 is an explanatory diagram of an example table used for path error determination according to a second embodiment of the present invention.

The second embodiment uses a score that is defined for each error type and is assigned to a path where an error occurs. Scores are totaled for each path and are used to determine whether or not to perform a failover. This method can accurately determine not only one type of error occurring on a path like in the first embodiment (FIG. 4), but also a plurality of types of errors occurring on a path.

Specifically, score "2" is assigned to an instantaneous break error. Score "1.43" is assigned to an accumulation error. Score "1.25" is assigned to a performance error. These values are used to find a total score. The total score is compared to the number of all paths to determine whether or not to perform a failover. The error score corresponding to the error type depends on the seriousness of effect on the throughput degradation. If the error is serious, the score is increased to change the server as soon as possible.

For example, case 4 at the top of the table shows that an instantaneous break error occurs on three paths, and an accumulation error occurs on two paths. The total score is 3×2+2×1.43=8.86. Since the total score exceeds the number of all paths (eight), it is determined that a failover is needed.

Likewise, case 5 at the center of the table shows that an accumulation error occurs on three paths, and a performance error occurs on four paths. The total score is 3×1.43+4×1.25=9.29. Since the total score exceeds the number of all paths (eight), it is determined that a failover is needed.

Further, case 6 at the bottom of the table shows that an instantaneous break error occurs on two paths, and an accumulation error occurs on two paths. The total score is 2×2+2×1.43+2×1.25=9.36. Since the total score exceeds the number of all paths (eight), it is determined that a failover is needed.

Figure 13:
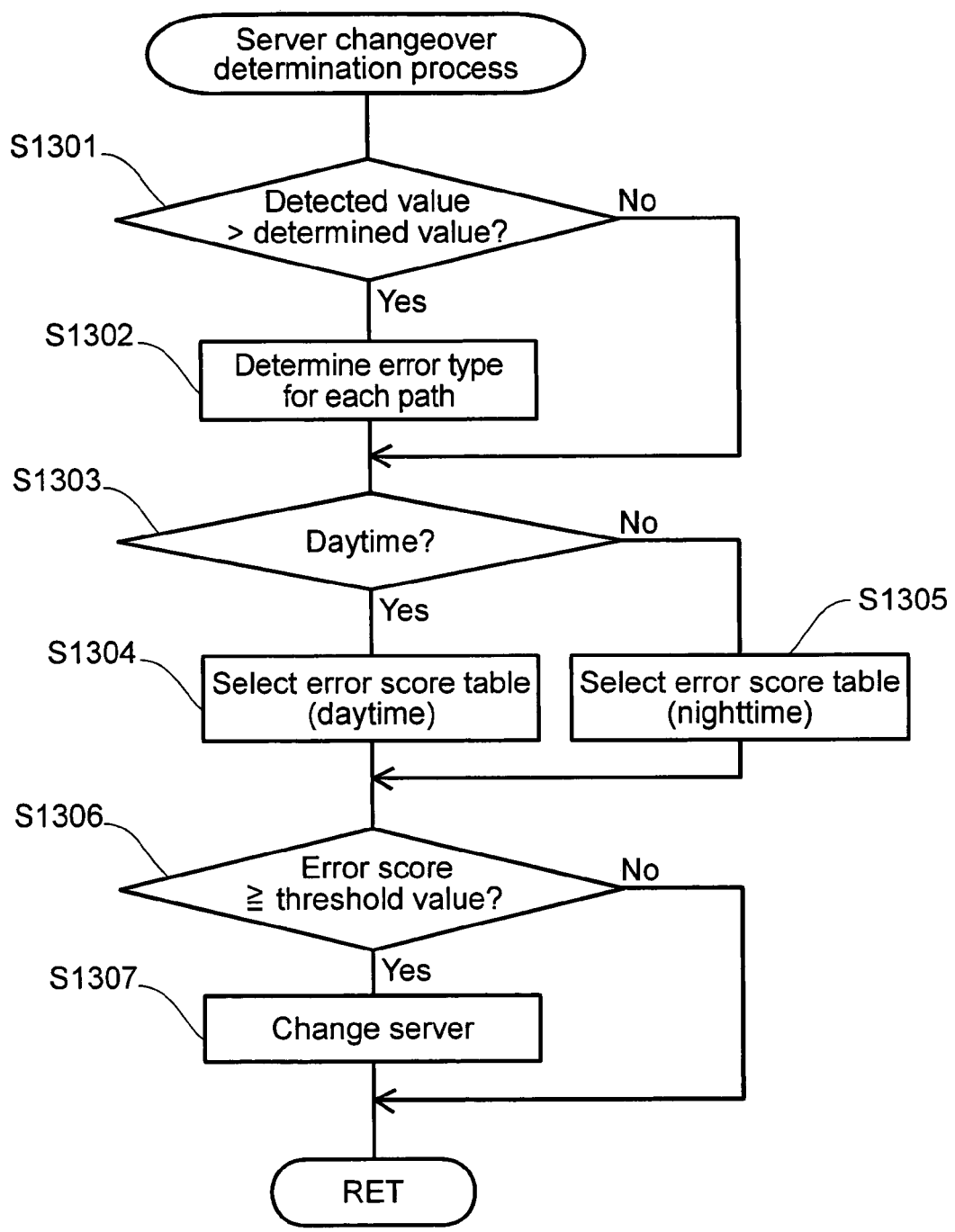
FIG. 13 is a flowchart of a server changeover determination process according to the second embodiment of the present invention.

FIG. 13 is a flowchart of a server changeover determination process according to the second embodiment of the present invention. This process is performed at step S506 of the server changeover process (FIG. 5). Only except a different server changeover process, the other processes in the second embodiment are the same as those of the above-mentioned first embodiment and a detailed description is omitted for simplicity.

The process first references the error management table (FIG. 7) to determine whether or not the detected value exceeds the criterion for each path (S1301). If the detected value exceeds the criterion, the process finds the error type that exceeds the threshold to specify the error type (S1302). The process performs this comparison with the criterion for all paths.

When a plurality of types of errors indicates detected values that exceed the criterion, the most serious error is assumed to be the error type for the path. The error seriousness needs to be predetermined in consideration for effects on throughput degradation, and the like. For example, it is a good practice to define the error seriousness in the order of the instantaneous break error, the accumulation error, and the performance error. Alternatively, it may be preferable to add points for a plurality of types of detected errors.

The process determines whether or not the time slot is daytime, i.e., subject to a high I/O process load (S1303). Since the information processing system according to the embodiment is subject to different I/O process loads depending on time slots, the high-load time slot and the low-load time slot are defined.

If the daytime (high-load time slot) is detected, the process selects the daytime column (S1304) in the error score table (FIG. 14). If the nighttime (low-load time slot) is detected, the process selects the nighttime column (S1305) in the error score table and finds a score to be added correspondingly to each error. The error score table in FIG. 14 defines a score given to the path where an error occurs. The score corresponds to each error type.

A total error score is defined correspondingly to the error type specified for each path at step S1302. The process compares the total error score with the threshold, i.e., the number of paths in this embodiment (S1306). If the total error score exceeds the threshold, the process issues a server changeover command (S1307).

As mentioned above, the second embodiment uses scores defined for the error types. In this manner, it is possible to accurately determine errors even if a plurality of types of errors occurs on the path. If a performance error occurs on six paths out of eight, the error score will be 7.5 (6×1.25) in the daytime. The error score will be 8.28 (6×1.38) at night, exceeding the threshold (8). Therefore, it is possible to suppress the failover in the daytime subject to high I/O loads and preferentially perform the failover at night subject to low I/O loads.

There may be an alternative to using the time-based error scores. It may be preferable to define error scores based on the I/O process amount and the throughput collected by the operation statistics management section 135. That is to say, a high error score may be used for the time slot with low I/O process load. A low error score may be used for the time slot with high I/O process load.

Figure 15:
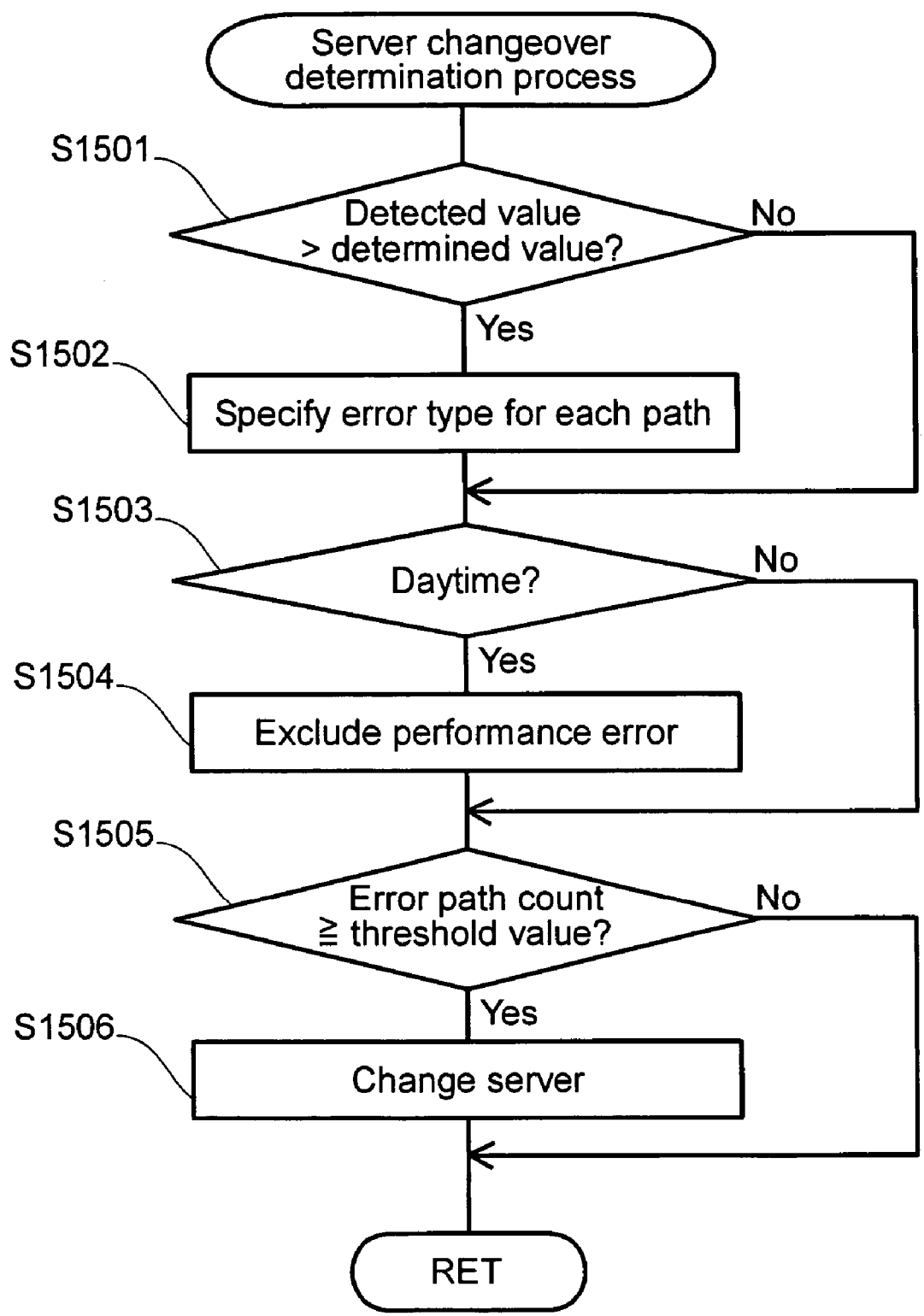
FIG. 15 is a flowchart of a server changeover determination process according to a third embodiment of the present invention.

FIG. 15 is a flowchart of a server changeover determination process according to the third embodiment of the present invention. This process is performed at step S506 of the server changeover process (FIG. 5).

The third embodiment differs from the first embodiment that changes the thresholds in accordance with the time slots (or I/O process loads). Instead, the third embodiment controls failover by changing error types to be determined for each time slot. Only except a different server changeover process, the other processes in the third embodiment are the same as those of the above-mentioned first embodiment and a detailed description is omitted for simplicity.

The process first references the error management table (FIG. 7) to determine whether or not the detected value exceeds the criterion for each path (S1501). If the detected value exceeds the criterion, the process finds the error type that exceeds the threshold to specify the error type (S1502). The process performs this comparison with the criterion for all paths. When a plurality of types of errors on one path indicates detected values that exceed the criterion, the plurality of types of errors is assumed to be the error type for that path.

The process determines whether or not the time slot is daytime, i.e., subject to a high I/O process load (S1503). Since the information processing system according to the embodiment is subject to different I/O process loads depending on time slots, the high-load time slot and the low-load time slot are defined.

If the daytime (high-load time slot) is detected, the process excludes a performance error and respecifies error types for each path (S1504). That is to say, when only the performance error occurs on a certain path, it is assumed that no error occurs on the current path. When only the performance error and another error (e.g., instantaneous break error) occur on a certain path, it is assumed that the other error (instantaneous break error) occurs on the current path.

The process compares the number of error-prone paths specified at step S1002 with a predetermined threshold, e.g., half the number of paths (S1505). If the number of error paths exceeds the threshold, the process issues a server changeover command (S1506).

A total error score is defined correspondingly to the error type specified for each path at steps S1502 and S1504. The process compares the total error score with the threshold, i.e., the number of paths in this embodiment. If the total error score exceeds the threshold, the process may issue a server changeover command.

As mentioned above, the third embodiment does not determine some types of errors (or determine only specified types of errors). Therefore, it is possible to suppress the failover in the daytime subject to high I/O loads and preferentially perform the failover at night subject to low I/O loads.

The information processing apparatus according to the embodiment of the present invention comprises an error detection section, a changeover evaluation section, and a changeover section. The error detection section detects an error occurred on a path according to a result of a data input/output request. The changeover evaluation section detects occurrence of error on a specified number of paths to determine whether or not to change an information processing apparatus connected to the storage even before occurrence of errors on all paths. The changeover section uses a determination result from the changeover evaluation section to change the information processing apparatus which requests data input/output from the logical unit. Consequently, it is possible to improve the throughput during a path error detection period when the server is changed. In addition, it is possible to prevent the throughput during the detection period from degrading by preventively changing the server before errors are detected on all paths.

The server changeover evaluation section changes the number of paths as a criterion for changing the information processing apparatus according to an error type specified by the error detection section. It is possible to appropriately determine whether or not to change the information processing apparatus according to error seriousness.

The server changeover evaluation section determines whether or not to change the information processing apparatus based on a combination of types of errors specified by the error detection section. Consequently, it is possible to appropriately determine whether or not to change the information processing apparatus even if different types of errors occur on a plurality of paths.

The server changeover evaluation section changes the number of paths as a criterion for changing the information processing apparatus according to a load state of a data input/output request. The information processing apparatus changeover is suppressed for a high-load time slot and is promoted for a low-load times lot. Consequently, it is possible to change the information processing apparatus during a time slot which has a little influence on applications.

The invention claimed is:

1. An information processing system comprising:
a storage having a logical unit logically assigned to a physical device; and
a plurality of information processing apparatuses which are selectively connected to said storage and request data input/output from said storage, said information processing system requesting data input/output via a plurality of paths as communication channels to said logical unit,
wherein each of said information processing apparatuses comprises:
an error detection section which detects occurrence of an error on a path according to a result of a data input/output request;
a changeover evaluation section which detects occurrence of error on a specified number of paths to determine whether or not to change an information processing apparatus connected to said storage even before occurrence of errors on all paths; and
a changeover section which uses a determination result from said changeover evaluation section to change said information processing apparatus requesting data input/output to/from said logical unit,
wherein said error detection section specifies an instantaneous break error resulting from a path's instantaneous break, and
wherein said changeover evaluation section assigns a larger value to the number of paths used as a criterion for changing an information processing apparatus due to said instantaneous break error than a value assigned to the number of paths used as a criterion for changing an information processing apparatus due to errors other than the instantaneous break error.

2. The information processing system according to claim 1, wherein
said error detection section specifies a performance error resulting from path performance degradation, and
said changeover evaluation section assigns a smaller value to the number of paths used as a criterion for changing an information processing apparatus due to said performance error than a value assigned to the number of paths used as a criterion for performing failover due to errors other than the performance error.

3. The information processing system according to claim 1, wherein
said error detection section specifies a type of said detected error, and
said changeover evaluation section uses a combination of a plurality of specified types of errors to determine whether or not to change said information processing apparatus.

4. The information processing system according to claim 3, wherein
said changeover evaluation section uses a result of totaling scores defined for types of errors occurring on a path to determine whether or not to change said information processing apparatus.

5. The information processing system according to claim 1, wherein
said changeover evaluation section changes the number of paths used as a criterion for changing said information processing apparatus according to a load state of a data input/output request.

6. The information processing system according to claim 1, wherein
said changeover evaluation section provides a time slot causing a high load state of a data input/output request with a smaller value assigned to the number of paths used as a criterion for changing said information processing apparatus than a value assigned to that for the other time slots.

7. An information processing system comprising:
a storage having a logical unit logically assigned to a physical device; and
a plurality of information processing apparatuses which are selectively connected to said storage and request data input/output from said storage, said information processing system requesting data input/output via a path as a communication channel to said logical unit,
wherein each of said information processing apparatuses comprises:
a path selection section which selects a path assigned with a data input/output request transmitted to said storage;
an input/output transmission/reception section which transmits a data input/output request issued to a path selected by said path selection section;
an operation statistics management section which totals process states of normally terminated data input/output requests;
an error management section which detects occurrence of an error on said path, specifies a type of said error, and totals the number of detected errors for each path and error type;
a changeover evaluation section which detects occurrence of error on a specified number of paths to determine whether or not to change an information processing apparatus connected to said storage even before occurrence of errors on all paths; and
a changeover section which uses a determination result from said changeover evaluation section to change said information processing apparatus requesting data input/output to/from said logical unit,
wherein said error management section specifies an instantaneous break error resulting from a path's instantaneous break and a performance error resulting from path performance degradation,
wherein said changeover evaluation section assigns a larger value to the number of paths used as a criterion for changing an information processing apparatus due to said instantaneous break error than a value assigned to the number of paths used as a criterion for changing an information processing apparatus due to errors other than the instantaneous break error, and
wherein said changeover evaluation section assigns a smaller value to the number of paths used as a criterion for changing an information processing apparatus due to said performance error than a value assigned to the number of paths used as a criterion for performing failover due to errors other than the performance error.

8. An information processing apparatus which is selectively connected to a storage having a logical unit logically assigned to a physical device and requests data input/output via a logical path as a communication channel to said logical unit, said apparatus comprising:
an error detection section which uses a result of a data input/output request to detect an error occurred on a path;
a changeover evaluation section which detects occurrence of error on a specified number of paths to determine whether or not to change an information processing apparatus connected to said storage even before occurrence of errors on all paths; and a changeover section which uses a determination result from said changeover evaluation section to change said information processing apparatus requesting data input/output from said logical unit, wherein said error detection section specifies an instantaneous break error resulting from a path's instantaneous break and a performance error resulting from path performance degradation, wherein said changeover evaluation section assigns a larger value to the number of paths used as a criterion for changing an information processing apparatus due to said instantaneous break error than a value assigned to the number of paths used as a criterion for changing an information processing apparatus due to errors other than the instantaneous break error, and wherein said changeover evaluation section assigns a smaller value to the number of paths used as a criterion for changing an information processing apparatus due to said performance error than a value assigned to the number of paths used as a criterion for performing failover due to errors other than the performance error.

9. The information processing apparatus according to claim 8, wherein said error detection section specifies a type of said detected error, and said changeover evaluation section uses a combination of a plurality of specified types of errors to determine whether or not to change said information processing apparatus.

10. The information processing apparatus according to claim 8, wherein said changeover evaluation section changes the number of paths used as a criterion for changing said information processing apparatus according to a load state of a data input/output request.

11. A control method of changing an information processing apparatus which requests data input/output from a storage having a logical unit logically assigned to a physical device via a logical path as a communication channel to said logical unit and is connected to said storage, said method comprising the steps of:

detecting occurrence of an error on a path according to a result of a data input/output request;

detecting occurrence of error on a specified number of paths to determine whether or not to change an information processing apparatus connected to said storage even before occurrence of errors on all paths;

using a determination result to change said information processing apparatus requesting data input/output from said logical unit;

in the step of detecting occurrence of an error on a specified number of paths, specifying an instantaneous break error resulting from a path's instantaneous break and a performance error resulting from path performance degradation;

in the step of using a determination result, assigning a larger value to the number of paths used as a criterion for changing an information processing apparatus due to said instantaneous break error than a value assigned to the number of paths used as a criterion for changing an information processing apparatus due to errors other than the instantaneous break error; and in the step of using a determination result, assigning a smaller value to the number of paths used as a criterion for changing an information processing apparatus due to said performance error than a value assigned to the number of paths used as a criterion for performing failover due to errors other than the performance error.

12. The control method according to claim 11, further comprising the steps of:

specifying a type of said detected error; and using a combination of a plurality of specified types of errors to determine whether or not to change said information processing apparatus.

13. The control method according to claim 11, further comprising the step of changing the number of paths used as a criterion for changing said information processing apparatus according to a load state of a data input/output request.

14. A program embodied in computer readable storage media executed by a computer for controlling an information processing apparatus, which requests data input/output from a storage having a logical unit logically assigned to a physical device via a logical path as a communication channel to said logical unit, said program effective to control said information processing a apparatus to perform the steps of:

assigning a larger value to the number of paths used as a criterion for changing an information processing apparatus due to an instantaneous break error than a value assigned to the number of oaths used as a criterion for changing an information processing apparatus due to errors other than the instantaneous break error;

assigning a smaller value to the number of paths used as a criterion for changing an information processing apparatus due to a performance error other than a value assigned to the number of paths used as a criterion for performing failover due to errors other than the performance error;

detecting an error occurred on a path according to a result of a data input/output request;

specifying the instantaneous break error resulting from a path's instantaneous break and the performance error resulting from path performance degradation;

detecting occurrence of error on a specified number of paths to determine whether or not to change an information processing apparatus connected to said storage even before occurrence of errors on all paths; and using a determination result to change said information processing apparatus requesting data input/output from said logical unit.

15. The program according to claim 14, further effective to control said information processing apparatus to perform the steps of:

specifying a type of said detected error; and using a combination of a plurality of specified types of errors to determine whether or not to change said information processing apparatus.

16. The program according to claim 14, further effective to control said information processing apparatus to perform the step of changing the number of paths used as a criterion for changing said information processing apparatus according to a load state of a data input/output request.

* * * * *